United States Patent Office 3,483,189
Patented Dec. 9, 1969

3,483,189
FABRIC TREATMENT WITH WATER-SOLUBLE
ISOCYANATES
Thomas K. Brotherton and Peter G. Naylor, Charleston,
W. Va., assignors to Union Carbide Corporation, a corporation of New York
No Drawing. Filed Oct. 29, 1965, Ser. No. 505,742
Int. Cl. C07d 41/04
U.S. Cl. 260—239.3                            7 Claims

ABSTRACT OF THE DISCLOSURE

Water-soluble blocked isocyanates are prepared by the nucleophilic addition of an inorganic hydrophile at an olefinic double bond in a position alpha, beta to the carbonyl group or groups of a blocked olefinic ester isocyanate monomer or polymer. As an illustration, the hydrophile sodium bisulfite is added to the blocked isocyanate formed by reacting methanol with bis(2-isocyanatoethyl) fumarate. The compositions of the invention are useful in the treatment of textiles to improve water and crease resistance.

---

The invention relates to the treatment of textiles, paper, leather and the like. In particular, the invention provides novel water-soluble isocyanate compounds which are extremely useful in the treatment of such materials. Specifically, the invention provides novel water-soluble compounds which generate a reactive isocyanato group in situ, and accordingly are useful in the treatment of a multitude of natural and synthetic substrates.

Water and crease resistance, as well as mechanical finish effects such as polishing have been successfully imparted to fabrics, paper and the like by treatment with reactive chemical treating agents. Isocyanate compounds are very effective in such applications but suffer from several disadvantages which preclude their widespread use. The insolubility of isocyanate compounds in aqueous media has restricted such processing to those applications where a water insoluble isocyanate can be applied as an aqueous suspension or emulsion. Moreover, the reactivity of the isocyanato group to water also hinders the use of aqueous media. Of course, such emulsion treatment does not enable the isocyanate to permeate the fabric or other material being processed but only affects outermost surfaces of the treated product. Attempts to water-solublize isocyanates have involved blocking the reactive isocyanate group with an inorganic hydrophile such as sodium bisulfite to at once render the isocyanate water-soluble and preclude reaction of the reactive isocyanato group with water. Although these inorganic-blocked isocyanates will regenerate the isocyanate group in situ, substantial unblocking of the isocyanato group takes place at temperatures less than 100° C., before all the water has been evaporated from the system. Accordingly, the regenerated isocyanate group of such bisulfite blocked isocyanates will react with the water present rather than with the material being treated. Since the choice of inorganic hydrophilic blocking agents is fairly restricted, and these water-soluble hydrophiles tend to unblock the isocyanate group at temperatures below 100° C., the water-soluble blocked isocyanates have not enabled exploitation of isocyanates in the fabric treating field.

The invention provides novel water-soluble blocked isocyanates, which may be monomeric or polymeric, the unblocking temperatures of which may be tailored to accommodate process conditions.

It is an object of the present invention to provide novel water-soluble blocked isocyanate compounds. It is a further object of this invention to provide novel water-soluble polymeric blocked isocyanates. It is a further object of this invention to provide novel monomeric and polymeric water-soluble blocked isocyanates which are capable of generating reactive isocyanato groups in situ. It is a further object of this invention to provide such water-soluble isocyanates which afford a wide choice of organic blocking agents enabling preselection of the desired unblocking temperature. It is still a further object of this invention to provide a broad spectrum of novel water-soluble blocked isocyanates which can be advantageously employed in the treatment of paper, textiles, leather and the like.

The novel water-soluble blocked isocyanates of this invention are prepared by the nucleophilic addition of an inorganic hydrophile at an olefinic double bond in a position alphabeta to the carbonyl group or groups (i.e., the double bond is between the alpha and beta carbon atoms) of a blocked olefinic ester isocyanate monomer or polymer. The double bond to which the addition takes place is therefore in the acid portion of the blocked ester isocyanate. The addition of the inorganic hydrophile to an olefinic bond acts effectively to saturate that double bond as will be apparent from the following reaction between an olefinic double bond and sodium bisulfite.

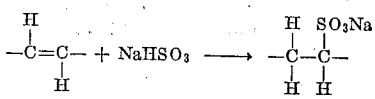

Accordingly the water-soluble blocked isocyanates of this invention are olefinic ester isocyanates, polyisocyanates, or polyisocyanate polymers, in which the reactive isocyanate groups have been blocked by an organic radical as a result of an isocyanato-active hydrogen reaction, and which olefinic ester blocked isocyanate has been water-solublized by addition of an inorganic hydrophile at the olefinic double bond.

There are provided by this invention novel monomeric water-soluble blocked isocyanates derived from a single monoisocyanate or diisocyanate, which novel compounds correspond to the Formula I:

I $$B'-\overset{O}{\overset{\|}{C}}-\overset{H}{\overset{|}{N}}-R-O-\overset{O}{\overset{\|}{C}}-\overset{R^1}{\overset{|}{\underset{A'}{C}}}-\overset{R^1}{\overset{|}{\underset{A'}{C}}}-Z$$

wherein one A′ represents an inorganic hydrophilic anion and the other represents hydrogen; wherein each R¹ represents a monovalent radical selected from the group consisting of hydrogen, halogen, alkyl, cycloalkyl and aryl and halogenated derivatives thereof, preferably R¹ is hydrogen or alkyl containing up to 12 carbon atoms, highly preferred up to 4 carbon atoms; wherein R represents a divalent organic radical selected from the group of substituted and unsubstituted aliphatic, alicyclic, and aromatic groups with the proviso that the blocked isocyanate function, i.e.,

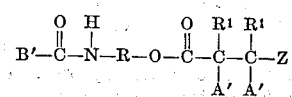

is at least two carbon atoms removed from the ester function, i.e., $$-O-\overset{O}{\overset{\|}{C}}-$$

wherein B′ is the residue of an active hydrogen-containing compound having the formula HB; and wherein Z is selected from the group consisting of hydrogen, monovalent organic groups free from substituents containing active hydrogen, and radicals of the formula

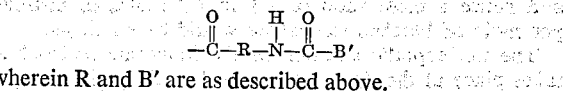

wherein R and B′ are as described above.

There are also provided in accordance with the invention novel polymeric water-soluble blocked isocyanates derived from linearly extended reaction products of polyisocyanates and polyfunctional active hydrogen compounds which correspond to Formula II:

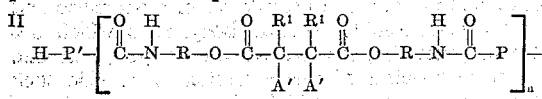

wherein A′, R¹, and R are the same as defined above with respect to Formula I, wherein $n$ is a number having a value of 1 or more and designates the average number of repeating units and wherein P′ is the residue of a difunctional active hydrogen-containing compound of the formula H–P′–H. It is pointed out that these water-soluble polymeric blocked isocyanates have an average total of $n$ repeating units. Preferably the polymeric water-soluble blocked isocyanates of this invention contain an average of from 2 to about 15 repeating units and hence $n$ is preferably a number having an average value of from 2 to 15.

The novel water-soluble blocked isocyanates of this invention are called, in the case where a bisulfite anion is added as the hydrophile, alkali metal sulfopropionates, sulfosuccinates and polysulfosuccinates. The scope of the novel compounds is more precisely defined with respect to the starting isocyanates and blocking agents discussed hereinafter.

By the terms "compound containing active hydrogen" and substituent containing active hydrogen" is meant a compound or radical containing one or more hydrogen atoms which are reactive as determined by the Zerewitinoff test described by Wohler in the Journal of the American Chemical Society, vol. 48, page 3181 (1927). Illustrative substituents which are active hydrogen-containing include, for example, hydroxyl, primary and secondary amino, carboxyl, phenolic hydroxyl, ureido, urethane, hydrazino, amido, mercapto, sulfonamide and the like as well as hydrogen atoms activated by proximity to a carbonyl group.

The novel water-soluble blocked isocyanates of this invention are prepared by adding an inorganic hydrophile to the double bond in the acid portion of a blocked olefinic ester isocyanate. Suitable inorganic salts which may be employed to add the inorganic hydrophile are the alkali metal bisulfites, preferably sodium bisulfite. The addition is preferably effected by adding the blocked isocyanate to a dilute aqueous solution containing a small molar excess of the bisulfite and heating the mixture at a temperature below the unblocking temperature of the blocked isocyanate until a solution is produced. The temperature required to effect solution will depend upon the isocyanate compound itself as well as the blocking agent employed. Generally temperatures of from about 60° C. to 100° C. are sufficient.

The inorganic hydrophile adds only at the double bond in the ester portion of the blocked isocyanate, which double bond is alpha-beta to the ester carbonyl group or groups of the blocked ester isocyanate. Accordingly, one mole of bisulfite compound is stoichiometrically equivalent to one mole of monomeric blocked isocyanate and accordingly it is preferred that a slight excess of bisulfite ranging from about 1.1 to 1.2 moles per mole of olefinic double bond in the acid moiety of the blocked isocyanate be employed to effect the addition. Consequently, when linearly extended polymeric blocked isocyanates, such as those set forth in Formula II, having, for example, an average total of 10 repeating units, the amount of bisulfite will range from about 11 to 12 moles per mole of linearly extended product. However, when a monomeric isocyanate is employed the mole ratio of bisulfite to blocked isocyanate will be identical to the ratio between bisulfite and acid-olefinic double bonds will be identical, and hence a mole ratio of 1.1 to 1.2 moles of bisulfite per mole of blocked isocyanate would be employed.

The nucleophilic addition of the inorganic hydrophile takes place at the double bond in the acid moiety of the isocyanate. As stated above, the olefinic bond to be substituted must be in a position alpha-beta to the carbonyl group or groups, and such proximity to the carbonyl group activates the double bond to participate in the nucleophilic addition. Olefinic double bonds in the R portion of the blocked isocyanate or in the blocking substituent (B′) will consequently not be substituted with the inorganic hydrophile.

In a further embodiment of this invention, there are provided novel water-soluble blocked isocyanates wherein the inorganic hydrophile is added at the double bond and is also employed to block the isocyanato group. These novel compositions correspond to Formula III:

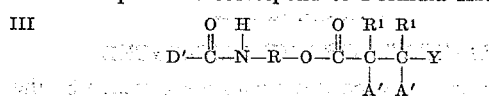

wherein A′, R′, and R are as defined above with respect to Formula I; wherein D′ represents an inorganic hydrophile such as the bisulfite radical (—SO₃Na) and wherein Y is selected from the group consisting of hydrogen, monovalent organic groups free from substituents containing active hydrogen, and radicals of the formula

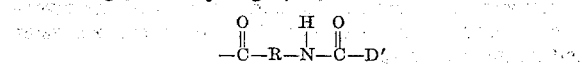

wherein R and D′ are as discussed above. Accordingly, these novel water-soluble bisulfite-blocked isocyanates are commensurate in scope with isocyanates of Formula I above save that the isocyanato groups are blocked with inorganic hydrophile groups such as bisulfite groups. These novel water-soluble bisulfite-blocked isocyanates are prepared by adding the ester diisocyanate to an aqueous solution containing an excess of the bisulfite and carefully maintaining the temperature below about 60° C. to prevent reaction of the isocyanate groups with water. Under carefully controlled temperature conditions, in the temperature range of from about 50–60° C., it has been found that the isocyanate-water reaction can be substantially avoided.

The novel water-soluble bisulfite-blocked isocyanates of this invention may be employed in the treatment of fabrics, paper, and the like. However, it is to be noted that the unblocking temperature of these bisulfite blocked isocyanates is lower than the unblocking temperature of the blocked isocyanates of Formulas I and II and often is less than 100° C. Accordingly, when these compounds are employed in fabric or paper treatment, it is preferred to effect the treatment of the fabric with a low temperature solution of the bisulfite blocked compound, permit substantial drying of the treated cloth at low temperatures in order to effect removal of most of the water, and subsequently heat the so treated cloth thus unblocking the isocyanate and permitting reaction of the regenerated isocyanate groups with reactive sites on the fabric.

The isocyanates which are employed in the preparation of the water-soluble isocyanate monomers and polymers of this invention correspond to Formula IV:

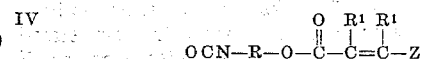

wherein R, R′ and Z are as defined above with respect to Formulas I and II. Accordingly, monoisocyanates which may be employed in preparing the water soluble blocked isocyanates of this invention include compounds of the general formula:

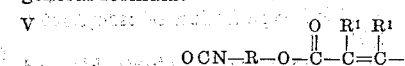

wherein R² is selected from the group consisting of hydrogen and monovalent organic groups free from substituents containing active hydrogen. Preferably R² is hydrogen or a hydrocarbon or halohydrocarbon group containing up to about 12 carbon atoms, such as alkyl, haloalkyl, aryl, haloaryl, cycloalkyl, halocycloalkyl, alkenyl, haloalkenyl, cycloalkenyl or halocycloalkenyl, alkaryl, aralkyl, cycloalkylalkyl or the like, and wherein R and R¹ are as hereinbefore defined.

The diisocyanates which may be employed in preparing the water soluble blocked isocyanates of this invention correspond to the formula:

VI
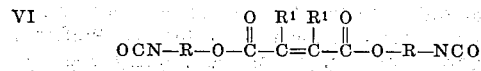
$$OCN-R-O-\overset{O}{\underset{\|}{C}}-\overset{R^1}{\underset{|}{C}}=\overset{R^1}{\underset{|}{C}}-\overset{O}{\underset{\|}{C}}-O-R-NCO$$

wherein R¹ and R are as hereinbefore defined. The water soluble blocked isocyanates derived from diisocyanato monomers are difunctional following unblocking and accordingly are preferred.

Illustrative of the monoisocyanates and diisocyanates which are useful in preparing the water-soluble blocked isocyanates of this invention are the isocyanato hydrocarbyl acrylates and substituted acrylates corresponding to Formula V and the diisocyanato hydrocarbyl fumarates, maleates and substituted fumarates and maleates, e.g., the citraconates and the like, according to Formula VI, wherein R is a hydrocarbon group containing from 2 to 12 carbon atoms with the proviso that the isocyanate function (OCN—) is at least two carbon atoms removed from the ester function $$(-O-\overset{O}{\underset{\|}{C}}-)$$

and wherein R² is as defined. Accordingly, typical radicals represented by R include alkylene, arylene, alkyl-substituted arylene, aryl-substituted alkylene, alkenylene, cycloalkylene, and cycloalkenylene. Preferred compounds are those wherein R is alkylene, i.e., corresponds to the formula $(C_nH_{2n})$ wherein $n$ is 2 to about 12. Accordingly, suitable compounds include 2-isocyanatoethyl acrylate, 2-isocyanatopropyl acrylate, 3-isocyanatopropyl acrylate, 2-isocyanatoethyl methacrylate, 3-isocyanato-2-methylpropyl, 1,2-dimethacrylate, 5-isocyanato-pentyl 1-propenoate, 5-isocyanato-2-methylphenyl 1-butenoate, 4-isocyanatophenyl acrylate, 4-isocyanato-2-methylphenyl methacrylate, 6-isocyanato-2-ethylhexyl 2-phenyl acrylate, 12-isocyanatododedecyl 2-octenoate, 4-isocyanatocyclohexyl 1-butenoate, 4-isocyanatocyclohexylmethyl 2-phenylacrylate, 4-cyclohex-3-enyl 1-(2-methylphenyl) acrylate, 5-isocyanatopentadi-2,4-enyl 1-decenoate, 4-isocyanatonaphthyl 1,6-octadienoate, 5-isocyanatobicyclo[2.2.1] hept-2-yl methacrylate, and the like. Preferred are the isocyanatoalkyl acrylates and alkyl substituted acrylates according to Formula V.

The diisocyanates according to Formula VI above are preferred in the production of the novel water-soluble blocked isocyanates of this invention since upon unblocking these compounds yield a difunctional isocyanate compound which is capable of crosslinking the material being treated, hence are eminently utilized in imparting mechanical finishes to processed material. Illustrative of the difunctional isocyanates useful in this invention are the isocyanato hydrocarbon and halohydrocarbon maleates and fumarates and substituted maleates and mumarates such as bis(2-isocyanatoethyl) fumarate, bis(3-isocyanatopropyl)glutaconate, bis(4-isocyanatobutyl) citraconate, bis(3,4-diethyl-5-isocyanatopentyl) chloromaanatoheptyl) chloromaleate, bis(2,2-dimethyl-3-isocyanatopropyl) fumarate, bis(3-ethyl-5-isocyanatopentyl) citraconate, bis(3,4-diethyl-5-isocyanatopentyl) chloromaleate, bis(4,4-dimethyl-6-isocyanatoxyl) phenylufmarate, bis(2-methyl-4-ethyl-6-isocyanatohexyl) ethylmaleate, bis(9-isocyanatononyl) citraconate, bis(5,6,7-triethyl-9-isocyanatononyl) fumarate, 2-isocyanatoethyl-3-isocyanatopropyl, 2,3-diphenylmaleate, 4-isocyanatobutyl-6-isocyanatohexyl butylmaleate, 3-isocyanatopropyl 8-isocyanatooctyl 3-butenylmaleate, 5-isocyanatopentyl 6-isocyanatohexyl citraconate, 2-methyl-3-isocyanatopropyl-2-isocyanatoethyl chloromaleate, 4-ethyl-7-isocyanatoheptyl 6-isocyanatohexyl chlorophenylmaleate, bis(4-isocyanato-2-butenyl) cyclohexylfumarate, bis(4-isocyanato-2-butenyl) citraconate, bis (2-isocyanatoethyl) citraconate, bis(7-isocyanato-4-heptenyl) fumarate, bis(8-isocyanato-4-octenyl) maleate, bis-(9-isocyanato-5-nonenyl) itaconate, bis (10-isocyanato-6-decenyl) fumarate, bis(3-ethyl-5-isocyanato-3-pentenyl) fumarate, bis(3-4-dimethyl-5-isocyanato-3-pentenyl) maleate, bis(2-methyl-4-ethyl-6-isocyanato-2-hexenyl) citraconate, bis(5,6,7-triethyl-9-nonyl) maleate, bis(3-cyclohexyl-5-isocyanatopentyl) chloromaleate, bis(4-cyclohexyl-6-isocyanatohexyl) fumarate, bis(5-cyclohexylmethyl-7-isocyanatoheptyl) glutaconate, bis(3-cycloheptyl-5-isocyanatopentyl) itaconate, bis(3-cyclohexenyl-5-isocyanatopentyl) glutaconate, bis-(5-cycloheptenylmethyl-8-isocyanatooctyl) fumarate, bis-(2-isocyanatocyclobutyl) fumarate, bis(3-isocyanatocyclopentyl maleate, bis(4-isocyanatocyclohexyl) citraconate, bis(5-isocyanatocycloheptyl) chloromaleate, bis(7-isocyanatocyclononyl) dimethyl fumarate, bis(3-isocyanato-4-cyclopentenyl) phenylmaleate, bis(5-isocyanato-6-cycloheptenyl) chlorophenyl maleate, bis(6-isocyanato-7-cyclooctenyl) ethyl fumarate, bis(2-isocyanatocyclobutylmethyl) citraconate, bis(2-isocyanato-2-ethylcyclobutyl) chloromaleate, bis[2(2'-isocyanatoethyl)cyclobutyl] fumarate, bis(isocyanatocyclopentylmethyl) fumarate, bis(3-isocyanato-2-ethylcyclopentyl) maleate, bis[3(2'-isocyanatoethyl)cyclopentyl]citraconate, bis(5-isocyanatocycloheptylmethyl) fumarate, bis(3-isocyanato-5-methyl cyclohexyl) fumarate, bis(3-isocyanato-5,6-dimethylcyclohexyl) glutaconate, bis(3-isocyanato-4,5-diethylcyclopentyl) fumarate, bis(4-isocyanatophenyl) fumarate, bis-(2-isocyanatophenyl) maleate, bis(3-isocyanatophenyl) citraconate, bis(7-isocyanato-2-naphthyl) chloromaleate, bis(7-isocyanato-1-naphthyl) ethylfumarate, bis(4'-isocyanato-4-biphenylyl) hexylfumarate, bis (5-isocyanato-2-indenyl) phenylmaleate, bis(4-isocyanatobenzyl) fumarate, bis(4-isocyanatophenylethyl) citraconate, bis(7-isocyanato-2-naphthylmethyl) maleate, bis[4(3'-isocyanatopropyl)phenyl]fumarate, bis(4-isocyanatomethylphenyl) fumarate, bis[2(3'-isocyanatopropyl) naphthyl] citraconate, bis(4-isocyanato-2-methylphenyl) dimethylmaleate, bis(6-isocyanato-2,4-xylyl) fumarate, bis(4-isocyanato-3-cumenyl) fumarate, bis(4-isocyanato-2-methoxyphenyl) citraconate, bis(4-isocyanatostyryl) fumarate, bis(4-isocyanatocinnamyl) fumarate, and the like.

The preferred ester diisocyanates useful in preparing the water-soluble blocked isocyanates of this invention are composed of carbon, hydrogen, oxygen, and nitrogen atoms. However, the novel diisocyanates can also contain groups such as oxy, thio, polythio, sulfonyl, sulfinyl, carbonyloxy, nitro, syano, halo, carbonate, and the like. The ester diisocyanates can be produced in relatively high yields by a process which involves the reaction of the corresponding ester diamine dihydrohalide starting material, contained in an inert, normally-liquid reaction medium, with a carbonyl dihalide, and thereafter recovering the ester diisocyanate product.

The starting materials for the production of the ester diisocyanates used in the present invention, are the corresponding olefinically unsaturated ester diamines or ester diamine salts. The ester diamine salts useful in preparing respectively the mono- and diisocyanates useful in this invention can be conveniently represented by the following formulas:

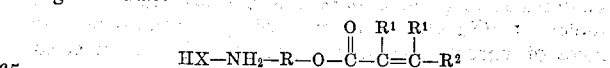
$$HX-NH_2-R-O-\overset{O}{\underset{\|}{C}}-\overset{R^1}{\underset{|}{C}}=\overset{R^1}{\underset{|}{C}}-R^2$$

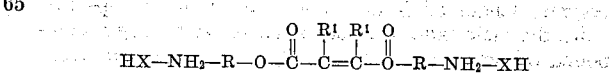
$$HX-NH_2-R-O-\overset{O}{\underset{\|}{C}}-\overset{R^1}{\underset{|}{C}}=\overset{R^1}{\underset{|}{C}}-\overset{O}{\underset{\|}{C}}-O-R-NH_2-XH$$

wherein R, R¹ and R² have the same values as indicated above and HX represents hydrogen chloride, hydrogen bromide, or mineral acids such as sulfuric, phosphoric, and the like. Other acid salts can also be utilized but inasmuch as hydrogen chloride has a common anion with phosgene it is the preferred salt, both from this, as well as economic considerations.

The preparation of the olefinically unsaturated ester diamines, and their hydrohalides, such as 2-aminoethyl acrylate hydrohalide, bis(2-aminoethyl) fumarate dihydrohalide, bis(4-aminophenyl) fumarate dihydrohalide and the like is the subject matter of an application entitled "Novel Amino Esters of Olefinically Unsaturated Polycarboxylic Acids and Process for Preparation" by T. K. Brotherton and J. W. Lynn, Ser. No. 212,481, filed July 25, 1962 now abandoned, and assigned to the same assignee as the instant invention.

These diamino starting materials are prepared, as indicated in the aforementioned copending application, by the reaction of an olefinically unsaturated polycarboxylic acid halide, such as fumaroyl chloride, and a hydroxy amine hydrohalide, such as monoethanolamine hydrohalide, at a temperature of from about 65° to about 95° C., for several hours. The ester diamine dihydrohalide is then isolated, as for example, by filtration and then washed and dried. By the aforementioned process the ester diamine dihydrohalides can be obtained in yields of about 95 percent and higher. For further information regarding the production of the ester diamines and their hydrohalides reference is hereby made to the disclosure of the aforementioned application.

Before the inorganic hydrophile is introduced upon the novel isocyanate compounds of this invention, the isocyanato groups must be blocked by reacting them with an active hydrogen-containing compound such as an alcohol, an amine or a carboxylic acid. The blocking of the free isocyanato groups may be effected using a monofunctional or polyfunctional active hydrogen compound. When preparing the monomeric blocked isocyanates such as illustrated in Formula I above, monofunctional active hydrogen compounds are preferred since such compounds preclude the possibility of linearly extending the polymeric chain. However, if the mode ratio of active hydrogen compound to diisocyanate is maintained in an amount greater than 2 to 1, substantial chain lengthening can be avoided, particularly if the active isocyanate is slowly added to the excess active hydrogen compound.

On the other hand when water soluble polymeric blocked isocyanates such as those in Formula II are desired, it is necessary to employ both a difunctional ester isocyanate as well as a difunctional active hydrogen compound. In such cases when a mole ratio of isocyanate to active hydrogen compound between 1.0 and 2.0 is employed, a blocked linearly extended isocyanate polymer will result. For example, if the mole ratio of diisocyanate to difunctional active hydrogen compound is maintained at 1:1 theoretically a polymer of infinite length, and actually an extremely high molecular weight polymer would result. Whereas at a mole ratio of diisocyanate:difunctional active hydrogen compound of 2:1, a monomeric blocked diisocyanate having a formula corresponding to Formula II wherein Z is

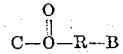

is obtained. Accordingly to produce a polymeric isocyanate according to Formula II, the diisocyanate and difunctional active H compound is reacted in relative amounts as to provide more than one and less than two moles of difunctional active hydrogen compound per mole of diisocyanate. In accordance with the preferred polymer length of from about 2 to about 15 repeating units, the mole ratio of difunctional active hydrogen compound:diisocyanate is preferably maintained at from about 1.07:1 to about 1.5:1.

Suitable active hydrogen compounds which can be employed to block the isocyanate groups of the ester isocyanates and diisocyanates include compounds containing one or two alcoholic hydroxyl groups, phenolic hydroxyl groups, carboxyl groups, primary and secondary amino groups, mercapto groups, amido groups, and the like. Thus typical active hydrogen-containing compounds include primary and secondary aliphatic and cycloaliphatic mono- and dihydric alcohols, mono- and dihydric phenols, mono- and dicarboxylic acids and anhydrides, the primary and secondary mono- and diamines, thiols, amides and the like. Also included among the useful active hydrogen compounds are other compounds which contain active hydrogen according to the Zerewitinoff test such as lactams, malonates, acetylacetonates, and the like. Preferred active hydrogen compounds are the primary and secondary aliphatic and cycloaliphatic alcohols and the phenols containing up to twelve carbon atoms.

Thus in Formulas I and II above, the groups designated B'— and —P'— represent the remainders of an active hydrogen compound following removal of the active hydrogen-containing group. The reaction of the isocyanate group with an active hydrogen-containing group results in the active hydrogen compound remaining intact save for the removal of the active hydrogen atom. However, it is pointed out that the radical designated by B in Formula I may contain an unreacted active hydrogen group although the formula shows one active hydrogen group reacted with isocyanate. As explained above, a difunctional active hydrogen compound may be employed in preparation of the monomeric water soluble blocked isocyanates according to Formula I so long as the proper mole ratio between difunctional active hydrogen compound and diisocyanate is observed. Thus, the active hydrogen compound designated B—H may be monofunctional or indeed a difunctional active hydrogen compound. In the latter case, the hydrogen substituent H designates solely the active hydrogen substituent which is reacted with isocyanate to block the monomeric isocyanate. On the other hand, when polymeric blocked isocyanates according to Formula II are prepared only a difunctional active hydrogen compound of the formula H—P—H is employed. In this case, some of the difunctional active hydrogen compound will form an internal part of the polymeric chain and hence both active hydrogen substituents will be reacted with isocyanate, whereas the chain is terminated on each end with a substituent —P—H indicating that only one active hydrogen-containing group has been reacted to block each end of the polymer.

The novel water-soluble blocked isocyanates of this invention may be tailored to unblock at a predetermined temperature range. For example, the novel compounds of this invention which are blocked with primary alcohols or polyols will unblock at a temperature of about 230° C. to 235° C. Compounds blocked with secondary alcohol derivatives unblock at a temperature of 225° C. to 230° C.; phenol derivatives at about 165° C., and enol derivatives obtained by use of an acetoacetate or a malonate, e.g., ethyl acetoacetate and diethyl malonate, unblock at about 160° C. Accordingly, by appropriate selection of the blocking agent, the water-soluble blocked isocyanates of this invention can be made to regenerate reactive isocyanato groups in situ at a particular temperature. It is pointed out that tertiary alcohols are preferably not employed as blocking agents in the novel compounds of this invention since upon unblocking these compounds often decompose to carbon dioxide and the olefin and amine corresponding respectively to the alcohol and isocyanate employed.

Illustrative of the aforesaid active hydrogen compounds which may be employed as blocking agents in the compounds of the instant invention are the alcoholic hydroxyl-containing compounds containing one or two alcoholic hydroxyl groups. Typical compounds include, for instance, the monohydric alcohols such as methanol, ethanol, propanol, isopropanol, 1-butanol, allyl alcohol, 2-butanol, 3-butenol, 1-pentanol, 3-pentanol, 1-hexanol, hex-5-en-1-ol, 3-heptanol, 2-ethyl-1-hexanol, 1-nonanol, 1-dodecanol, cyclohexanol, cyclopentanol, trimethylcyclohexanol, benzyl alcohol, cyclohexylmethanol, 4-oxytetratetracyclo[6.2.1.0$^{2,7}$.0$^{3,5}$]undecan - 9 - ol, 2,6 - trimethyl - 4 - heptanol, 2, 6,8-trimethyl-4-nonanol, phenyl methyl carbinol, tetrahydropyran-2-methanol, and the like including the hyroxyl-containing oxyalkylene compounds such as methoxy ethanol, methoxy ethylene glycol and the like. Polyhydric alcohols which may be employed as blocking agents in both the monomeric blocked isocyanates of Formula I and the linearly extended polymeric blocked isocyanates of Formula II include the alkylene glycols and polyether glycols such as ethylene glycol, propylene glycol, butylene glycol, 2,2 - dimethyl - 1,3 - propanediol, 2,2-diethyl-1,3-propanediol, 3 - methyl - 1,5 - pentenediol, 2-butene-1,4-diol, 2 - ethyl - 1,3 - hexanediol and the like; the oxyalkylene glycols such as diethylene glycol, dipropylene glycol, triethylene glycol, and the like; the ortho-, meta-, and parahydroxymethylphenyl propanols, the various phenylene diethanols, and heterocyclic diols such as 1,4-piperazino diethanol and the like.

Typical phenolic compounds which may be employed in the practice of the invention are phenol, o-cresol, m-cresol, p-cresol, α-naphthyol, β-naphthyol, p-nitromethylphenol, p-butylphenol, phenoxyethanol, p-toluol, 2,2-bis (hydroxyphenyl)propane, and the like.

Illustrative of the amino-containing compounds which may be employed as blocking agents are those which contain at least one primary amino group (—NH$_2$) or secondary amino group (—NHR) wherein R is hydrocarbyl such as alkyl, aryl, cycloalkyl, etc.) or mixtures of primary and secondary amino groups. Illustrative of the amino-containing compounds include the aliphatic amines such as the alkylamines, e.g., the methyl-, ethyl-, n-propyl-, isopropyl-, n-butyl-, sec-butyl-, isobutyl-, tert-butyl-, n-amyl-, n-hexyl, and 2-ethylhexylamines, as well as the corresponding dialkylamines; the aromatic amines such as aniline, ortho-toluidine, meta-toluidine, and the like; the cycloaliphatic amines such as cyclohexylamine, dicyclohexylamine, and the like; the heterocyclic amines such as pyrrolidine, piperidine, morpholine, and the like; the various aliphatic diamines of the general formula

monosecondary diamines of the general formula

and disecondary diamines of the general formula

where $n$ equals 2 to 10, and more, and where R'' is hydrocarbyl such as alkyl, aryl, aralkyl, alkaryl, or cycloalkyl; the etheric diamines of the formula

wherein $n$ is an integer of 2 to 10, and wherein R' is alkylene or oxaalkylene of 2 to 10 atoms; the aromatic diamines such as meta-phenylenediamine, para-phenylenediamine, toluene - 2,4 - diamine, toluene - 2,6-diamine, 1,5 - naphthalenediamine, 1,8 - naphthalenediamine, meta-xylylenediamine, para - xylylenediamine, benzidine, 3,3'-dimethyl - 4,4' - biphenyldiamine, 3,3' - dimethoxy - 4,4'-biphenyldiamine, 3,3' - dichloro - 4,4' - biphenyldiamine, 4,4' - methylenedianiline, 4,4' - methylene-bis(ortho-chloroaniline), 4,4' - ethylenedianiline, 2,3,5,6 - tetra-methyl-para - phenylenediamine, 2,5 - fluorenediamine, and 2,7-fluorenediamine; the cycloaliphatic diamines such as 1,4-cyclohexanediamine,4,4' - methylenebiscyclohexylamine, and 4,4' - isopropylidenebiscyclohexylamine; and the heterocyclic amines such as piperazine, 2,5 - dimethylpiperazine, 1,4 - bis(3 - aminopropyl)-piperazine, and the like.

Typical of the carboxyl-containing blocking agents are those organic compounds which contain at least one carboxyl group (—COOH) as exemplified by the monocarboxyl-containing compounds such as alkanoic acids; the cycloalkanecarboxylic acids; the monoesterified dicarboxylic acids; e.g.,

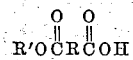

wherein R' is an organic radical such as oxahydrocarbyl, hydrocarbyl, etc., and R is the divalent residue of a dicarboxylic acid after removal of the two dicarboxylic groups; the polycarboxylic acids, e.g., the aliphatic, cycloaliphatic, and aromatic dicarboxylic acids; and the like. Specific examples include propionic acid, butyric acid, valeric acid, dodecanoic acid, acrylic acid, cyclohexanecarboxylic acid, the mono-2-ethylhexyl ester of adipic acid, succinic acid, maleic acid, glutaric acid, adipic acid, pimelic acid, suberic acid, azelaic acid, sebacic acid, chlorendic acid, 4,4'-oxydibutyric acid, 5,5'-oxydivaleric acid, 6,6'-oxydihexanoic acid, 4,4'-thiodibutyric acid, 5,5'-thiodivaleric acid, 6,6'-thiodihexanoic acid, itaconic acid, phthalic acid, isophthalic acid, terephthalic acid, the tetrachlorophthalic acids, 1,5-naphthoic acid, 2,7-naphthoic, 2,6-naphthoic acid, 3,3'-methylenedibenzoic acid, 4,4'-(ethylenedioxy)dibenzoic acid, 4,4'-biphenyldicarboxylic acid, 4,4'-sulfonyldibenzoic acid, 4,4'-oxydibenzoic acid, the various tetrahydrophthalic acids, the various hexahydrophthalic acids, tricarballylic acid, aconitic acid, citric acid, hemimellitic acid, trimellitic acid, trimesic acid, pyromellitic acid, 1,2,3,4-butanetetracarboxylic acid, and the like.

Still further compounds which may be employed as blocking agents are those which contain two different groups of the class of amino, carboxyl, and hydroxyl and can be exemplified by the hydroxycarboxylic acids, the aminocarboxylic acids, the amino alcohols, and the like. Illustrative examples include 2-hydroxypropionic acid, 6-hydroxycaproic acid, 11-hydroxyundecanoic acid, salicyclic acid, para-hydroxybenzoic acid, beta-alanine, 6-aminocaproic acid, 7-aminoheptanoic acid, 11-aminoundecanoic acid, para-aminobenzoic acid, and the like; the amino alcohols of the general formula HO(CH$_2$)$_n$NH$_2$, wherein $n$ equals 2 to 10; other hydroxyalkylamines such as N-methylethanolamine, isopropanolamine, N-methylisopropanolamine, and the like; the aromatic amino alcohols like para - amino - phenethylalcohol, para-amino-alpha-methylbenzyl alcohol, and the like; the various cycloaliphatic amino alcohols such as 4-aminocyclohexanol, and the like; the higher functional amino alcohols having a total of at least three hydroxy and primary or secondary amino groups such as the dihydroxyalkylamines, e.g., diethanolamine, diisopropanolamine, and the like; 2-(2-aminoethylamino)ethanol; 2 - amino-2-(hydroxymethyl)-1,3-propanediol; and the like.

The further compounds which may be employed include the enol forming compounds such as the acetoacetates and malonates, including ethyl acetoacetate, phenylethyl acetate, dimethylmalonate, diisopropylmalonate, and the like; the lactams such as caprolactam, the thiols such as ethyl mercaptan, butyl mercaptan and the like, and in short the broad spectrum of active hydrogen-containing compounds which contain substituents which are reactive with isocyanate groups, and which will upon application of heat regenerate the active hydrogen compound and a reactive isocyanate group. As stated above, the compounds employed as blocking agents in this invention preferably contain up to twelve carbon atoms. Preferred blocking agents are the mono- and polyfunctional alcohols, phenols, acids and amines, as well as compounds containing a combination of such active hydrogen groups, such as the alkanolamines and the like.

The isocyanato-reactive hydrogen reaction can be conducted over a wide temperature range. In general, a temperature range of from about 0° to about 250° C. can be employed. To a significant degree the choice of reactants and catalyst, if any, influences the reaction temperature. Of course, steric hindrance of the reactive group either in the diisocyanate or the active hydrogen compound will retard reaction and necessitate use of temperatures toward the upper portion of the range. The upper limit of the reaction temperature is used on the basis of the thermal stability of the reactive group and of the reactants whereas the lower limitation is employed to a significant degree by the rate of reaction.

If desired, various compounds can be employed as catalysts for isocyanato-active hydrogen reactions. Compounds which are often times useful for catalyzing in situ the reaction include tertiary amines, phosphines, and various organic metallic compounds in which the metal can be bonded to carbon and/or other atoms such as oxygen, sulfur, nitrogen, hydrogen, halogen, and phosphorus. The metal moiety of the organic metallic compounds can be, among other, tin, titanium, lead, potassium, sodium, arsenic, antimony, iron, cobalt, nickel and the like. The tertiary amines and the organic tin compounds which contain at least one oxygen to tin bond or at least one carbon to tin bond are eminently preferred. In particular, preferred organic metallic compounds include the acylates, particularly the alkanoates and alkoxides of Sn(II), Sn(IV), Pb(II), Ti(IV), Zn(IV), Cu(II), Mn(II), Fe(III), Fi(II), K and Na. The most useful organo-metallic catalysts are the dialkyltin dialkanoates.

Specific examples by way of illustration are 1,4-diazabicyclo[2.2.2]octane, N-methylmorpholine, sodium acetate, potassium laurylate, stannous octoate, stannous oleate, lead octoate, tetrabutyltitanate, cobalt naphthenate, tetramethyl tin, dibutyltin dilaurylate, stannous chloride, bismuth nitrate, and the like.

The isocyanate-reactive hydrogen reaction may be accomplished without a catalyst but when one is used, it should be employed in catalytic amounts. In general, a catalyst concentration in the range of from about 0.001 weight percent to about 2 weight percent based on the total weight of the reactants has been observed to be useful.

The time of the isocyanato-active hydrogen reaction may vary from a few minutes to several days and will depend upon the reaction temperature, the identity of the active hydrogen compound, and the diisocyanate, and upon the absence or presence of a catalyst. In the instant invention, the reaction is conducted for a period of time sufficient to react or "block" all the isocyanate group of the ester diisocyanate. Since the isocyanate group is reactive with water, it is necessary to block all the free isocyanate prior to the addition of the inorganic hydrophile.

The preferred method of treating the novel water-soluble blocked isocyanates of this invention may be employed to treat a number of fibrous and non-fibrous substrates containing reactive groups, e.g., hydroxyl groups, carboxyl groups and/or amino groups. In carrying out the treatment process, the material to be treated is first impregnated with an aqueous solution of the blocked isocyanate and then permitted to dry or partially day. Following this, the material is heated to effectively regenerate isocyanate groups which can react with the active hydrogen groups in the material. Simultaneously with the regeneration of the isocyanate groups, the active hydrogen compound used as a blocking agent is also regenerated. At the temperatures employed in heat-treating the material, these blocking agents can be made to vaporize, and accordingly, are removed from the material by evaporation. However, in any case the regenerated isocyanate groups tend to react with reactive substituents on the material being treated. Thus if the active hydrogen compound is not removed from the heated material by evaporation during the heat treatment, it may be subsequently flushed or washed away by suitable methods.

Among the many materials that can be treated in accordance with the invention are paper, cotton, wool, polyamide fibers, and many other materials that contain reactive hydrogen. Such materials are thus rendered more useful because various properties such as water-repellency and the like are improved.

The following examples are illustrative.

EXAMPLE 1

Bis-[2-(methoxyformamide)ethyl]fumarate 254 grams of molten bis(2-isocyanatoethyl) fumarate (1 mole) was added dropwise with stirring to a large excess of methanol (400 milliliters). The temperature quickly rose to reflux and was maintained for half an hour after the addition. On cooling a white solid was obtained. This was filtered and dried in vacuum to yield 302 grams of a product having a melting point of 117–118° C. The yield corresponded to 95 percent of the theoretical based upon the bis(2-isocyanatoethyl) fumarate charge. Recrystallization of the product from methanol gave a white powder having a melting point of 117–117.5° C. which was identified as bis-[2-(methoxyformamide)ethyl] fumarate.

Analysis.—Calculated: C, 45.28; H, 5.70; N, 8.80. Found: C, 45.40; H, 5.73; N, 8.66.

EXAMPLE 2

Sodium bis-[2-(methoxyformamide)ethyl] sulfosuccinate 100 grams of bis-(methoxyformamide)ethyl fumarate (0.32 mole) was added to 35 grams of sodium bisulfite in 350 milliliters of water. The bisulfite was slightly in excess of the stoichiometric requirement. The mixture was stirred at 70° C. until a clear solution was obtained. The water was stripped from the solution under vacuum to yield a white paste which was subsequently dissolved in hot ethanol. Excess sodium bisulfite was filtered from the ethanol solution and the ethanol was removed from the filtrate under vacuum to yield 126 grams of product which correspond to a 95 percent yield based on the charge. The product was an extremely hygroscopic white solid which required repeated thorough drying under vacuum. The product was identified as sodium bis-[2-(methoxyformamide)-ethyl] sulfosuccinate.

Analysis.—Calculated for $C_{10}H_{19}N_2O_{11}SNa$: C, 34.13; H, 4.53, N, 6.64. Found: C, 34.01, N, 4.56, N, 6.38.

EXAMPLE 3

Bis(2-[2-(ethoxycarbonyl)acetoacetamide]ethyl)fumarate

To 300 milliliters of ethyl acetoacetate containing 5 drops of dibutyltin dilaurate catalyst, there was added dropwise over a period of one hour, 246 grams of molten bis(2-isocyanatoethyl) fumarate. No reaction occurred after heating the mixture at 100° C. for one hour. A small pea of sodium dissolved in 15 milliliters of ethyl acetoacetate was then added to the cooled mixture. A vigorous reaction took place causing the temperature to rise to 100° C. On cooling a white solid was precipitated. This was filtered, washed with ether, and dried under vacuum at 50° C. to yield 309 grams of a fine white powder having a melting point of 115–118° C., which yield corresponded to 62 percent of theoretical based on the charge. Recrystallization from ethyl acetate give fine white crystals which had a melting point of 119–122° C. which was identified as bis(2-[2-(ethoxycarbonyl) acetoacetamide]ethyl) fumarate.

Analysis.—Calculated: C, 51.35; H, 5.88; N, 5.45. Found: C, 51.27; H, 6.09; N, 5.48.

EXAMPLE 4

Sodium bis(2-[2-(ethoxycarbonyl)acetoacetamido] ethyl) sulfosuccinate 20 grams of bis(2-[2-(ethoxycarbonyl)acetoacetamide] ethyl) fumarate as prepared in Example 3 were added to 6.4 grams of sodium bisulfite in 1.5 liters of water. The amount of sodium bisulfite was slightly in excess of the stoichiometric requirement. The mixture was heated at 95–100° C. for three hours at which time a clear solution was obtained. Following procedures similar to that described in Example II, there were obtained 18 grams of a white hygroscopic solid corresponding to a 74 percent yield, which solid was identified as sodium bis(2-[2-(ethoxycarbonyl)acetoacetamide]ethyl) sulfosuccinate.

Analysis.—Calculated for $C_{22}H_{31}N_2O_{15}SNa$: C, 42.72; H, 5.06; N, 4.53. Found: C, 42.69; H, 5.05; N, 4.39.

EXAMPLE 5

Bis[2-(n-butylureylene)ethyl] fumarate

To a stirred mixture of 62 grams of n-butylamine in 300 milliliters of ether, there was added dropwise over a period of about one-half hour 98 grams of bis(2-isocyanatoethyl) fumarate (.38 mole). The temperature of the mixture rose to 39° C. and a white solid was precipitated. Upon filtration, there was obtained 153 grams of product having a melting point of 159.5–161° C., which corresponded to a 95 percent yield based on the charge. Recrystallization from 60 percent aqueous isopropanol gave a material having a melting point of 160–161° C. which was identified as bis[2-(n-butylureylene)ethyl] fumarate.

*Analysis.*—Calculated for $C_{18}H_{32}N_4O_6$: C, 54.00; H, 8.06; N, 13.99. Found: C, 53.78; H, 8.09; N, 13.89.

EXAMPLE 6

Sodium bis[2-(n-butylureylene)ethyl] sulfosuccinate

To an excess of sodium bisulfite dissolved in 100 milliliters of water, there was added 19.8 grams of bis[2-(n-butylureylene)ethyl] fumarate (0.054 mole) as prepared in Example 5. The mixture was heated at 90–95° C. for 8 hours with constant stirring in order to give a clear solution. Following procedures similar to that of Example 2, there was obtained 19 grams of a white hygroscopic solid corresponding to a 77 percent yield based on the charge, which solid was identified as sodium bis-[2-(n-butylureylene)ethyl] sulfosuccinate.

*Analysis.*—Calculated for $C_{18}H_{33}N_4O_9SNa$: C, 43.12; H, 6.63; N, 10.54. Found: C, 42.87; H, 7.54; N, 10.27.

EXAMPLE 7

Bis[2-(2-ketohexamethyleneiminoformamide)ethyl] fumarate

To a stirred mixture of 300 grams of molten ε-caprolactam and 5 drops of dibutyltin dilaurate catalyst, there was added 254 grams (1 mole) of bis(2-isocyanatoethyl) fumarate over a period of 1.75 hours. The amount of caprolactam constituted a slight excess based upon the amount of isocyanate. On cooling the viscous liquid solidified to a white solid which was ground into a fine powder and washed repeatedly with ether to remove excess caprolactam. There was obtained 483 grams of a fine white powder having a melting point of 140–141° C., corresponding to a quantitative yield based upon the charge. Recrystallization from ethyl acetate gave a fine crystalline white material having a melting point of 140–141° C. and identified as bis[2-(2-ketohexamethyleneiminoformamide)ethyl] fumarate.

*Analysis.*—Calculated for $C_{22}H_{32}N_2O_8$: C, 55.00; H, 6.72; N, 11.66. Found: C, 55.26; H, 6.21; N, 11.44.

EXAMPLE 8

Sodium bis[2-(2-ketohexamethyleneiminoformamide)ethyl] sulfosuccinate

To 21.7 grams of sodium bisulfite dissolved in 500 milliliters of water, there was added 100 grams of bis[2-(2-ketohexamethyleneiminoformamide)ethyl] fumarate (0.17 mole). The amount of sodium bisulfite was stoichiometrically equivalent to the blocked isocyanate. The mixture was stirred for 2 hours at 95–100° C. to obtain a clear solution. Following procedures similar to that in Example 2, there was obtained 114 grams of a white hygroscopic solid corresponding to a 94 percent yield, which solid was identified as sodium bis[2-(2-ketohexamethyleneiminoformamide)ethyl] sulfosuccinate.

*Analysis.*—Calculated for $C_{22}H_{33}N_4O_{11}$: C, 45.20; H, 5.69; N, 9.58. Found: C, 44.85; H, 5.97; N, 9.16.

EXAMPLE 9

Bis-[2-(ethoxyformamide)-methylethyl] fumarate

To 150 milliliters of ethanol containing 5 drops of dibutyltin dilaurate catalyst, there was added dropwise with stirring 71 grams of bis(2-isocyanato-2-methylethyl) fumarate. The amount of ethanol was in excess of the stoichiometric requirement. The temperature of the mixture rose to 72° C. during the addition, and afterwards the mixture was refluxed for 0.5 hour. At the end of this time the infrared spectrum of the mixture showed no isocyanate peak at 4.4μ. No precipitate was obtained on standing. Excess ethanol was stripped off under vacuum to give 88.5 grams of a colorless viscous liquid which corresponded to a 94 percent yield based upon the charge. The liquid did not solidify on standing. However, after stirring the product in water and then stripping off the water under vacuum, a solid containing a large amount of viscous liquid was obtained. This product was identified as bis[2-(ethoxyformamide)-methylethyl] fumarate.

*Analysis.*—Calculated for $C_{16}H_{26}N_2O_8$: C, 51.31; H, 7.00; N, 7.48. Found: N, 7.26.

EXAMPLE 10

Sodium bis[2-(ethoxyformamide)-1-methylethyl] sulfosuccinate

To a solution of 8.5 grams of sodium bisulfite dissolved in 200 milliliters of water, there was added 25 grams of bis[2-(ethoxyformamide)-methylethyl] fumarate. The amount of bisulfite was slightly in excess of the stoichiometric requirement. The mixture was stirred at 90° C. for 5 hours after which a small amount of viscous liquid remained undissolved and this was removed. Water was stripped off the solution at 70° C. under vacuum. The residue was dissolved in ethanol and filtered to remove excess sodium bisulfite. Removal of the ethanol from the filtrate under vacuum followed by drying gave 23 grams of a white hygroscopic solid corresponding to a yield of 70 percent based on the charge, which solid was identified as sodium bis[2-(ethoxyformamide)-1-methylethyl] sulfosuccinate.

*Analysis.*—Calculated for $C_{16}H_{27}N_2O_{11}$: C, 40.19; H, 5.16; N, 5.86; S, 6.70. Found: C, 38.87; H, 5.72; N, 6.23; S, 6.73.

EXAMPLE 11

Bis-[2-(n-butylureylene)-1-methylethyl] fumarate

To 37 grams of sodium bisulfite (0.5 mole) dissolved in 300 milliliters of diethyl ether containing 5 drops of dibutyltin dilaurate catalyst, there was added 71 grams of bis-(2-isocyanato-2-methylethyl) fumarate (0.25 mole). A reaction occurred immediately leading to refluxing of the ether and precipitation of a very pale yellow solid. The mixture was stirred for an additional hour after which the solid was filtered and washed repeatedly with ether. There was obtained 110 grams of a pale yellow solid having a melting point of 130–136° C. corresponding to a quantitative yield based upon the charge. The product was recrystallized from aqueous isopropanol to give a white solid which had a melting point of 133–138° C. which solid was identified as bis-[2-(n-butylureylene)-1-methylethyl] fumarate.

*Analysis.*—Calculated for $C_{20}H_{36}N_4O_6$: C, 56.06; H, 8.47; N, 13.08. Found: C, 55.66; H, 8.39; N, 13.08.

EXAMPLE 12

Sodium bis-[2-(n-butylureylene)-1-methylethyl] sulfosuccinate

To a solution of 5 grams of sodium bisulfite dissolved in 200 milliliters of water, there was added 20 grams of bis-[2-(n-butylureylene)-1-methylethyl] fumarate. The amount of sodium bisulfite was slightly in excess of the stoichiometric requirement. The mixture was stirred at 85–90° C. for 12 hours after which the undissolved solid was filtered off and discarded. The water was removed from the filtrate under vacuum at 70° C. and the residue was dissolved in hot ethanol. After filtering to remove excess sodium bisulfite, the ethanol was stripped off under vacuum to yield 17 grams of a white hygroscopic solid corresponding to a 68 percent yield based upon the charge. The solid was identified as sodium bis-[2-(n-butylureylene)-1-methylethyl] sulfosuccinate.

*Analysis.*—Calculated for $C_{20}H_{37}N_4O_9SNa$: C, 45.10; H, 7.00; N, 10.52. Found: C, 44.55; H, 6.77; N, 10.43.

EXAMPLE 13

Sodium bis-[2-(sodiumsulfoformamide)-2-methylethyl] sulfosuccinate

To a molten solution of bis-(2-isocyanato-2-methylethyl) fumarate, there was slowly added a solution of 93.2 grams of sodium bisulfite (0.9 mole) in 157.5 milliliters of water at a temperature of 53° C. The temperature was carefully controlled at 55–60° C. to prevent the isocyanate water reaction. By means of this careful temperature control, very little carbon dioxide was evolved. Water was stripped off the resultant solution under vacuum to yield 175 grams of a white hygroscopic solid identified as sodium bis-[2-(sodiumsulfoformamide)ethyl] sulfosuccinate.

*Analysis.*—Calculated for $C_{10}H_{13}N_2O_{17}S_3Na_3$: C, 21.19; H, 2.31; N, 4.96; S, 16.97. Found: C, 20.14; H, 2.84; N, 4.46; S, 16.06.

What is claimed is:
1. Alkali metal bis[beta-(alkoxyformamido)alkyl] sulfosuccinate wherein the alkyl has from 2 to 3 carbon atoms and the alkoxy has from 1 to 12 carbon atoms.
2. The composition of claim 1 wherein the alkali metal is sodium.
3. The composition of claim 1 wherein said composition is sodium bis[beta-(methoxyformamido)ethyl] sulfosuccinate or sodium bis[2-(ethoxyformamido)-1-methylethyl] sulfosuccinate.
4. Alkali metal bis[beta-(2-[ethoxycarbonyl]acetoacetamido)alkyl] sulfosuccinate wherein the alkyl has from 2 to 3 carbon atoms.
5. Alkali metal bis[beta-(alkylureylene)-alkyl] sulfosuccinate wherein the alkyl portion of the alkylureylene has from 1 to 8 carbon atoms, and wherein said alkyl has from 2 to 3 carbon atoms.
6. Alkali metal bis[beta-(alkali metal sulfoformamido) alkyl] sulfosuccinate wherein the alkyl has from 2 to 3 carbon atoms.
7. Alkali metal bis[beta-(2'-ketohexamethyleneiminoformamido)alkyl] sulfosuccinate wherein the alkyl has from 2 to 3 carbon atoms.

References Cited

UNITED STATES PATENTS

| 2,976,208 | 3/1961 | Lindner | 260—481 |
| 2,976,209 | 3/1961 | Lindner | 260—481 |
| 2,976,211 | 3/1961 | Lindner | 260—481 |

HENRY R. JILES, Primary Examiner

R. T. BOND, Assistant Examiner

U.S. Cl. X.R.

117—138.5, 142, 154, 155; 260—453, 471, 481, 482, 553